Sept. 23, 1958   H. LEBOUTET   2,853,688
AMPLITUDE MODULATORS MILLIMETER WAVES
Filed May 19, 1954   2 Sheets-Sheet 1

Sept. 23, 1958  H. LEBOUTET  2,853,688
AMPLITUDE MODULATORS MILLIMETER WAVES
Filed May 19, 1954  2 Sheets-Sheet 2

2,853,688

AMPLITUDE MODULATORS FOR MILLIMETER WAVES

Hubert Leboutet, Paris, France, assignor to Compagnie Generale de Telegraphie Sans Fil, a corporation of France Application May 19, 1954, Serial No. 430,954

Claims priority, application France May 22, 1953

4 Claims. (Cl. 333—81)

The present invention relates to a device whose function is to interrupt or chop at a given rate, i. e. to amplitude modulate to 100%, a millimeter wave propagating in a wave guide.

As is known, commonly utilized amplitude modulating means cannot be used for millimeter waves. For the latter waves, special modulators are used and, among others, mechanical modulators.

Thus the problem arises in the field of millimeter waves to provide effective attenuators which may be inserted without difficulty in waveguides to amplitude modulate the ultra-high frequency energy. Now, it is impossible to transpose to this field all the arrangements used in the field of centimeter waves as the waveguides are of very small size, ranging about one millimeter.

One is thus led to use only attenuators of the shutter type. It is known to realize such attenuators in the shape of plane cams, made of an absorbing material, which are caused to rotate in the plane of symmetry of a guide, the cams penetrating into the guide through a slot provided in one of its walls.

However, owing to the material used for making such shutters (for instance cardboard coated with carbon or aquadag), the thickness of the latter can hardly be made lower than $1/10$ millimeter. Now, a slot of this width radiates a substantial part of the energy being propagated in the guide. This is a very serious drawback, in view of the low power supplied by usual millimeter wave generators.

Attempts have been made to make metal shutters coated with an absorbing material, of much smaller thickness (of the order of $1/100$ millimeter). It has been found however that, for various reasons, the attenuation brought about by such shutters was a poor one.

The present invention relates to a millimeter wave attenuator, of the type mentioned above, which is free of these drawbacks and is more particularly designed to 100% modulate millimeter waves.

The device according to the invention comprises a portion of a waveguide for millimeter waves, combined with a plane metal shutter of very small thickness, the shutter being adapted for penetrating, at least in certain positions thereof, into the guide substantially in the middle plane of the latter. That portion of shutter, which penetrates into the guide, has a radius of curvature which is great, compared to the wavelength $\lambda_a$ in the guide of the wave propagating in the guide, and is formed with a series of $$\frac{\lambda_a}{4}$$

wide teeth separated by $$\frac{\lambda_a}{4}$$

wide intervals.

The above described device is designed either to be series inserted into a guide or connected thereto as a stub.

In such cases where the device according to the invention is series inserted in the guide in which a millimeter wave is to be chopped at a given frequency, the device concerned is made up of a toothed sector, and the frequency, at which the wave is chopped, is equal to the frequency of rotation of the sector.

Where the device according to the invention is mounted as a stub, it consists of a toothed disc, and the frequency, at which the propagated millimeter wave is chopped, is equal to the frequency of rotation multiplied by the number of teeth of the disk.

The invention will be best understood from the following description and the attached drawings, wherein, Figure 1 is an explanatory diagram of the operating principle of the device according to the invention;

Figure 1:
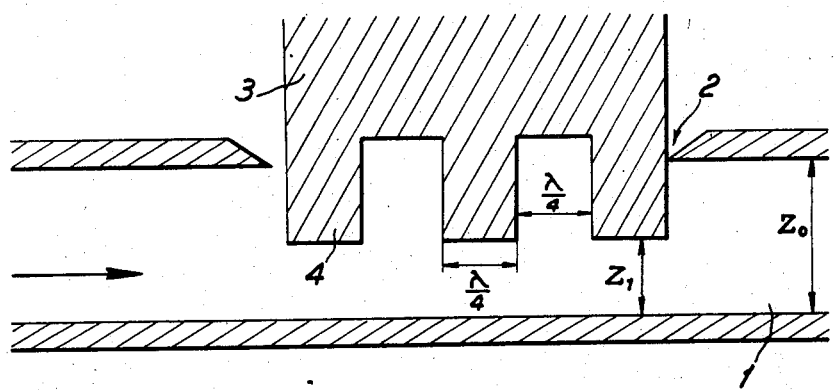

Referring now to Figure 1, there may be seen in the latter a cross section of, for example a rectangular waveguide 1 for millimeter waves, along a symmetry plane perpendicular to the larger walls of the guide. A slot 2 is provided, in the upper wall of the guide. An attenuator 3, consisting of a plane metal foil, of about $1/100$ millimeter thickness, penetrates into the guide 1 through the slot 2. Means are provided for keeping the attenuator 3 in the symmetry plane of the guide 1. That portion of the attenuator, which penetrates into the guide, displays along its edge a series of $$\frac{\lambda_a}{4}$$

wide teeth, $\lambda_a$ being the wavelength in the guide of a millimeter wave which is assumed to propagate therein. The distance between the teeth is also $$\frac{\lambda_a}{4}$$

If the number of teeth is great enough and if the teeth project deeply enough into the guide, the attenuator, as seen from the source, constitutes a purely reactive impedance.

Assuming that $Z_0$ is the characteristic impedance of that portion of the waveguide which does not include the slot, when a tooth 4 penetrates into the guide, it forms an obstacle therein, with the result that, in that part of the guide into which this tooth projects, the characteristic impedance is no longer $Z_0$ but assumes another value $Z_1$, which is smaller than $Z_0$. It may be assumed that, between the teeth, the characteristic impedance is still $Z_0$.

In that section of the guide over which the slot extends, the guide is equivalent to a sequence of quarter-wave guides whose characteristic impedances are alternately $Z_0$ and $Z_1$. If $n$ is the number of teeth, a simple calculation shows that such a guide, as viewed from the front face of the first tooth, provides the impedance $$Z = Z_1 \left(\frac{Z_1}{Z_0}\right)^{2n}$$

Since it has been assumed that $Z_1 < Z_0$, Z may be considered substantially equal to zero if $n$ is great enough.

Thus the obstacle 3, as viewed from the first tooth, constitutes an impedance of zero value, hence a reflecting obstacle, if $n$ is great enough.

Experience shows that this is true when $n$ is greater than 5.

Figure 2:
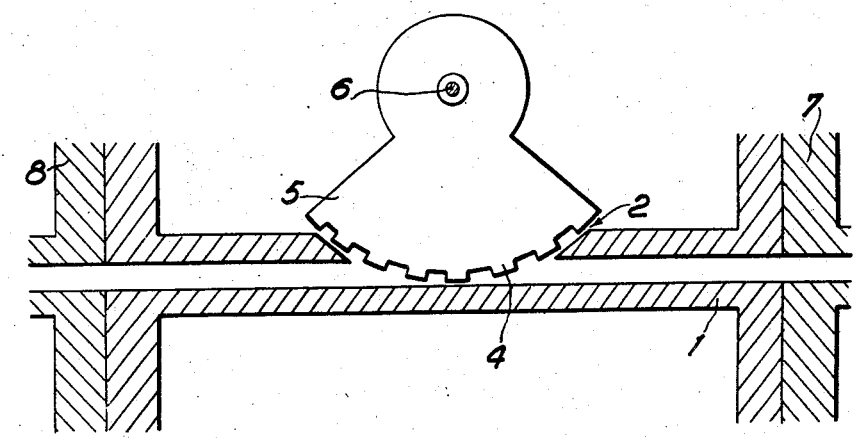
Figure 2 shows an elevation sectional view of a specific embodiment of the device according to the invention.

It will be interesting to see what happens if a shutter, or attenuator, 5 is rotated about an axis 6, as shown in Fig. 2.

As long as the teeth 4 of the shutter 5 do not project into the guide, the impedance of the latter is equal to the characteristic impedance $Z_0$. This impedance tends to approach zero as soon as a tooth penetrates into the slot 2 and is restored to a value equal to the characteristic impedance $Z_0$, when the teeth are driven out of the slot. Such a device will thus chop, or amplitude-modulate to 100%, the energy propagating along the guide 1, at the frequency of the rotation of the shutter 5.

Now, it is of interest to modulate millimeter waves, at frequencies of the order of 10 periods per second, in order to detect the existence of such waves. Gas cells are used for this purpose, having as their main constituent a vibrating membrane whose natural frequency ranges about 50 periods per second. Therefore, the use of these cells involves modulation of the wave at a lower frequency.

According to Fig. 2, the wave guide portion 1 has been provided with two flanges 7 and 8, which enable that portion of the guide 1 to be inserted in a transmission line.

Figure 3:
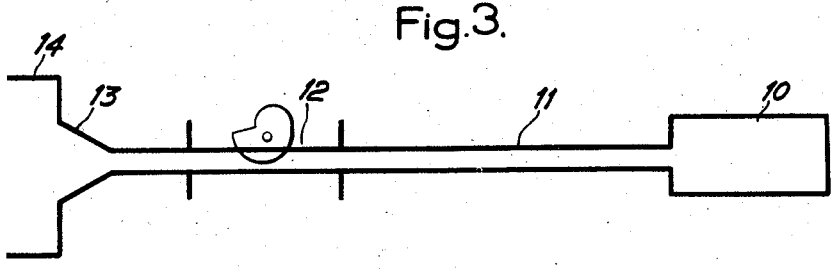
Figure 3 shows diagrammatically a circuit incorporating a device according to the invention.

Figure 3 shows diagrammatically a millimeter wave detecting circuit using the device of Figure 2.

A millimeter wave generator 10 feeds a guide 11, in which is inserted a wave guide portion 12, as shown in Fig. 2. An impedance matching system 13 is used to match the guide to a detecting gas cell 14.

Figure 4:
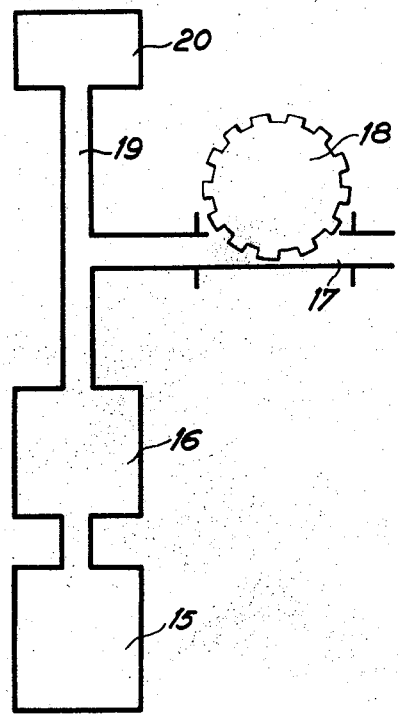
Figure 4 shows diagrammatically a modification of the invention.

Figure 4 shows a diagram of another device for detecting the presence of millimeter waves.

In this figure, the device according to the invention is mounted as a stub 17 which is coupled in series with a guide 19, wherein is propagated a millimeter wave, generated by a source 15 which feeds a load 20. In this case, the attenuator of the device 18 is no longer a sector, but actually a toothed disc whose teeth are shaped and spaced as explained above.

An attenuator 16 is inserted in the guide 19, between the stub 18 and the generator 15, thus preventing the energy, liable to be reflected toward the generator 15, from reaching the latter.

The operation of such a device is readily understandable with reference to Figure 1.

It is clear that the number of teeth of the wheel 18 engaged in the slot 2 varies by no more than one tooth viewed from the front of the first tooth, the impedance of the wheel 18 is zero, this front moving along a distance equal to $$\frac{\lambda_a}{2}$$

It is as though a short-circuiting piston were moving inside the guide, along a travel equal to $$\frac{\lambda_a}{2}$$

The distance between guide 19 and the slot in the guide 17 is equal to a whole number of $$\frac{\lambda_a}{2}$$

Under these conditions, it is seen readily that the impedance, as seen from the guide, looking into the stub 17, varies from $-\infty$ to $+\infty$, while a tooth is being replaced by the following tooth at the inlet of the slot.

In the foregoing, no allowance has been made for what happens when a tooth is half engaged into the slot. It may be assumed, and this is confirmed experimentally, that when a tooth is half engaged into the slot, the effect it exerts on the behavior of the whole assembly is negligible.

By means of the above system, the wave propagating from the source 15 towards the load 20 is 100%, or nearly 100%, modulated at a frequency $F = n N$, $n$ being the number of teeth and N, the rotational speed of the disc 18 in revolutions per second. If the number of teeth is great enough, it will thus be possible to modulate the energy at a much higher frequency than with the previously described modification.

The invention may be used in many fields and is of course not limited to the described examples.

What I claim is:

1. A system for 100% modulating, or chopping, millimeter waves comprising: a wave guide portion for said waves; a movable metallic plane attenuator positioned in a plane of symmetry of said guide portion and having an edge in the shape of teeth separated by intervals and adapted for projecting at least five teeth, at least in certain positions thereof, into said guide; the teeth and the intervals having respective lengths equal to $$\frac{\lambda_a}{4}$$

and the traverse dimension of said attentuator being of the order of $\frac{1}{100}$ compared to $\lambda_a$, $\lambda_a$ being the wavelength in the guide of said wave.

2. A system for 100% modulating, or chopping, millimeter waves comprising: a wave guide portion for said waves; a rotatable metallic plane attenuator positioned in a plane of symmetry of said guide portion and with an edge having teeth separated by intervals and adapted for projecting at least five of said teeth, at least in certain positions of said edge, into said guide; said teeth and said intervals having respective lengths equal to $$\frac{\lambda_a}{4}$$

and the transverse dimension of said attenuator being of the order of $\frac{1}{100}$ compared to $\lambda_a$, $\lambda_a$ being the wavelength in the guide of said wave.

3. A system for 100% modulating, or chopping, millimeter waves propagating in a rectangular wave guide having small and large walls comprising: a wave guide portion for said wave having a slot in the plane of symmetry of said large walls, means for inserting said portion into said guide; a rotatable metallic plane attenuator in the shape of a toothed sector adapted for projecting at least five teeth during its rotation into said slot; said teeth and the intervals therebetween having respective lengths equal to $$\frac{\lambda_a}{4}$$

and the transverse dimension of said attenuator being of the order of $\frac{1}{100}$ compared to $\lambda_a$, $\lambda_a$ being the wavelength in the guide of said wave.

4. A system for 100% modulating, or chopping, millimeter waves, propagating in a rectangular wave guide having small and large walls, comprising: a wave guide portion for said wave, having a slot in the plane of symmetry of said large walls; means for connecting said portion as a stub to said guide, the distance between said slot and said guide being equal to $n$ $$\frac{\lambda_a}{2}$$

$n$ being an integer; a rotatable metallic plane attenuator in the shape of a toothed disc adapted for projecting at least five teeth during its rotation into said slot; said teeth and the intervals therebetween having respective lengths equal to $$\frac{\lambda_a}{4}$$

and the transverse dimension of said attenuator being or the order of 1/100 compared to $\lambda_a$, $\lambda_a$ being the wavelength in the guide of said wave.

References Cited in the file of this patent

UNITED STATES PATENTS

| | | |
|---|---|---|
| 2,567,748 | White | Sept. 11, 1951 |
| 2,576,943 | Jenks | Dec. 4, 1951 |
| 2,683,855 | Blitz | July 13, 1954 |
| 2,705,307 | Nyswander | Mar. 29, 1945 |